March 2, 1971  S. E. TILBY  3,567,510
METHOD AND APPARATUS FOR SEPARATING COMPONENTS OF SUGARCANE
Filed Dec. 20, 1967  5 Sheets-Sheet 1
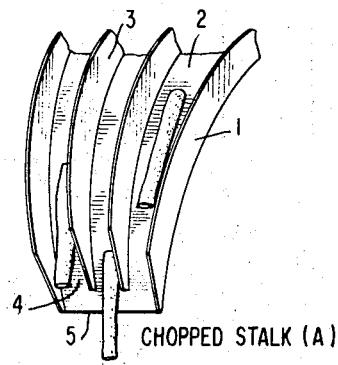
FIG.1
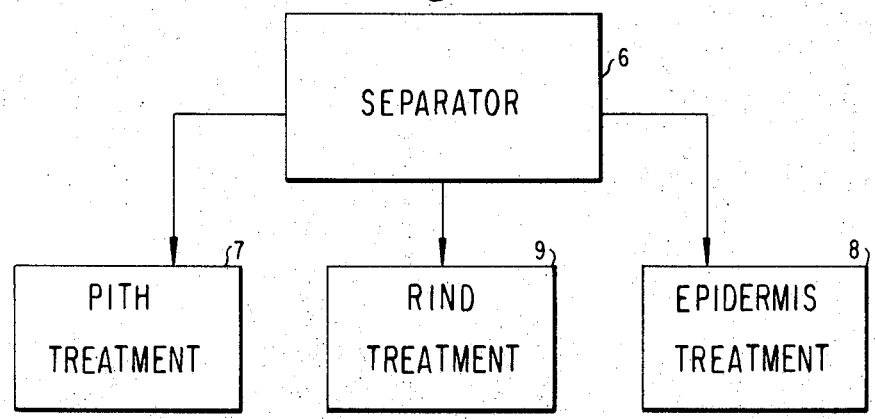
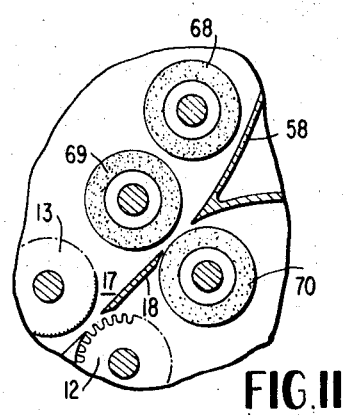
FIG.II
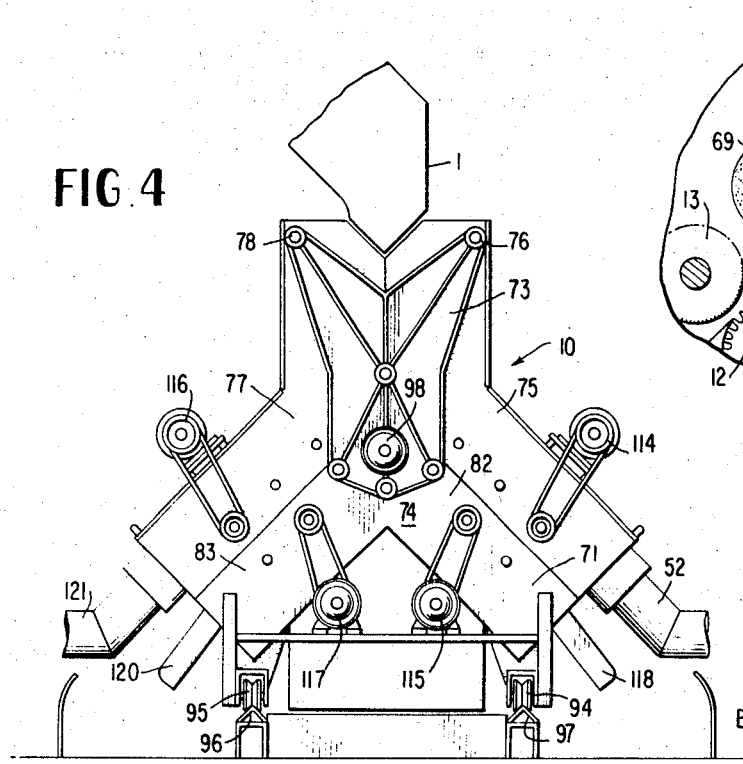
FIG.4
INVENTOR
SYDNEY EDWARD TILBY
BY
ATTORNEYS

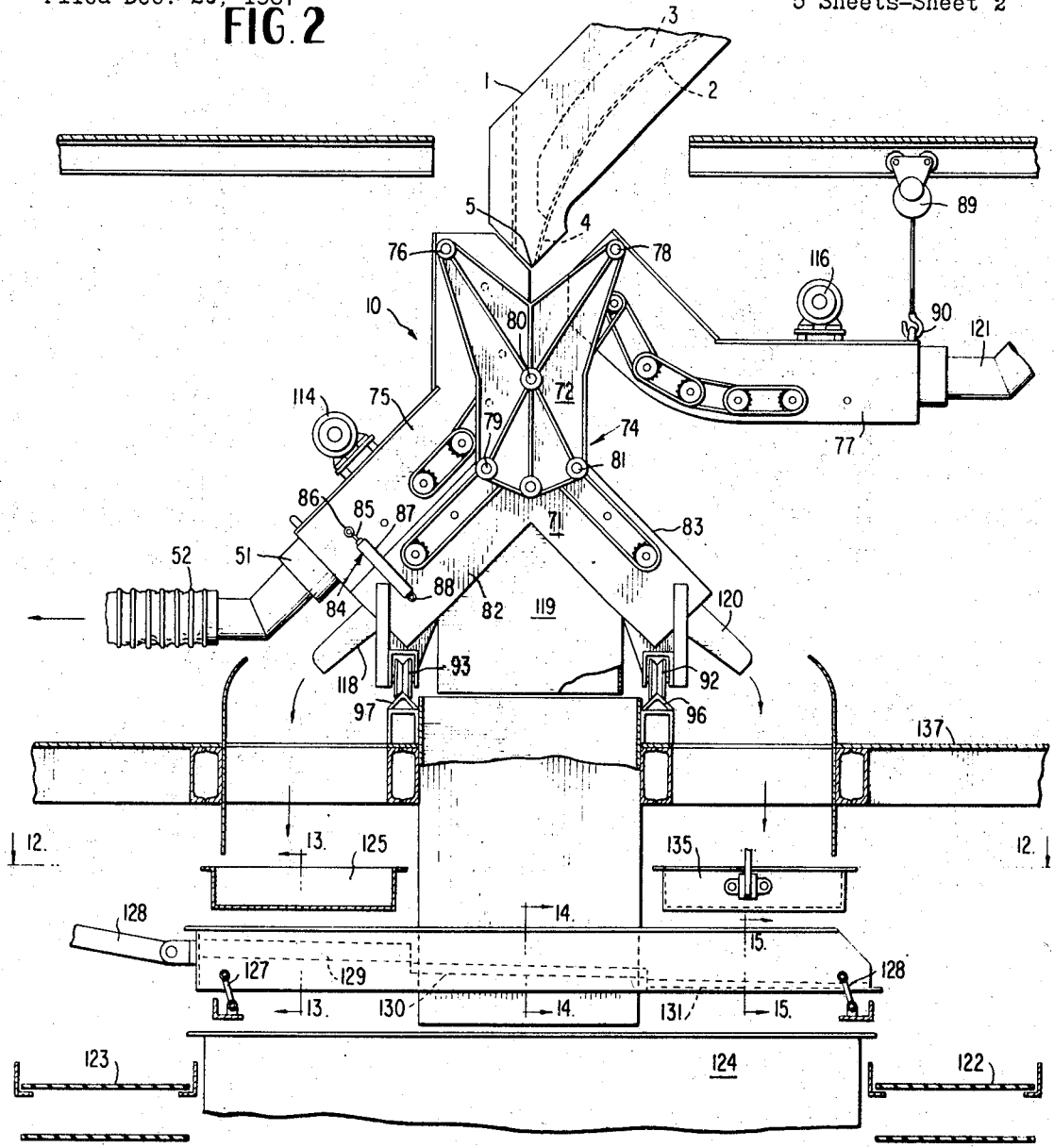

March 2, 1971  S. E. TILBY  3,567,510
METHOD AND APPARATUS FOR SEPARATING COMPONENTS OF SUGARCANE
Filed Dec. 20, 1967  5 Sheets-Sheet 3
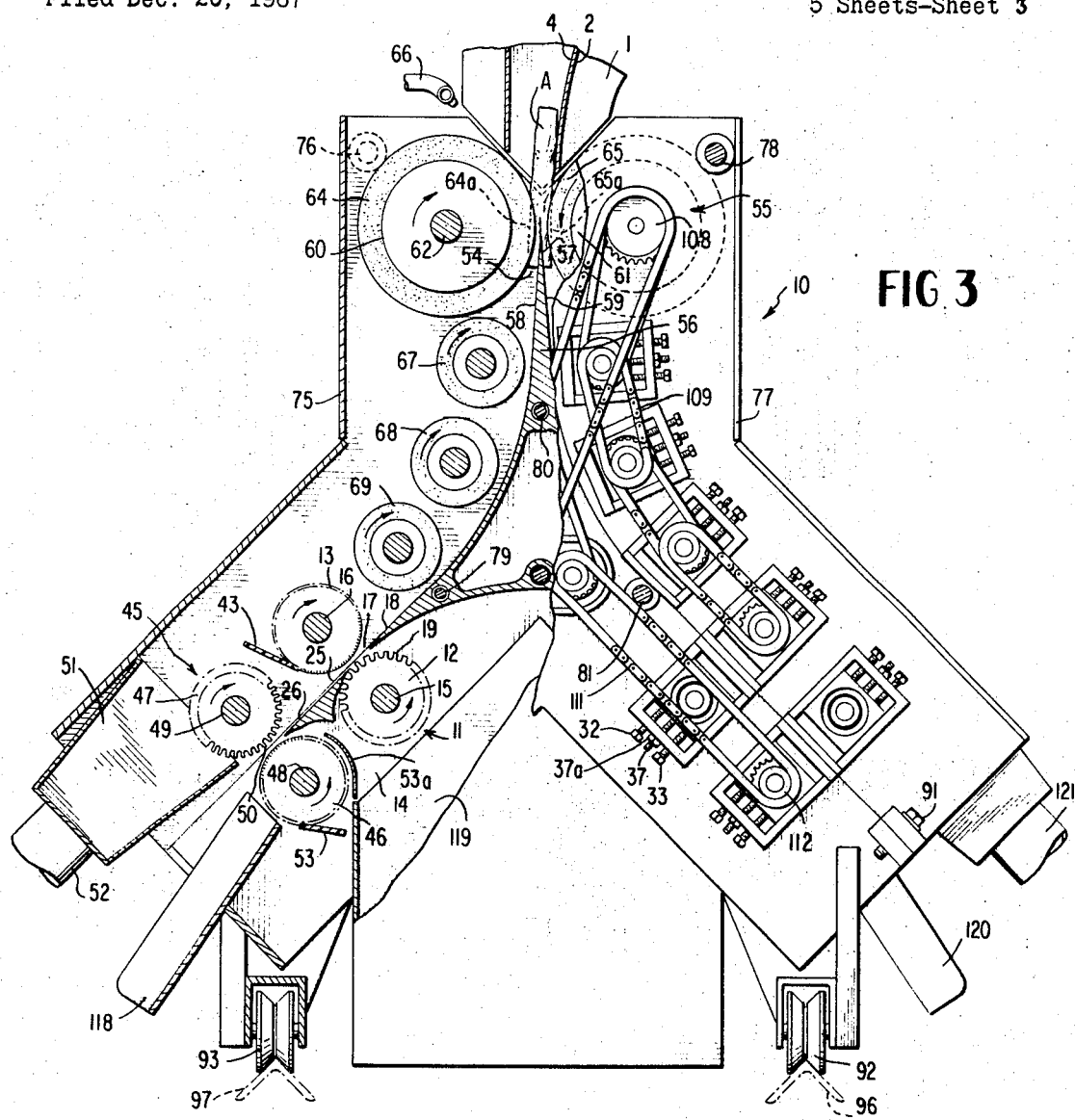
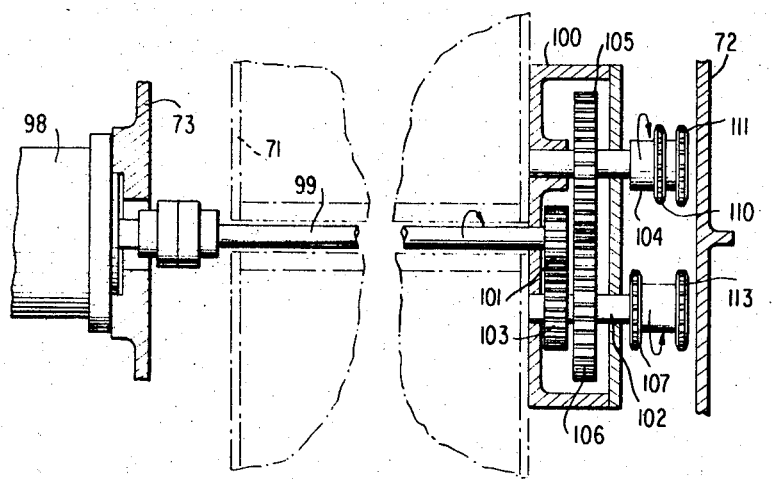

March 2, 1971  S. E. TILBY  3,567,510
METHOD AND APPARATUS FOR SEPARATING COMPONENTS OF SUGARCANE
Filed Dec. 20, 1967  5 Sheets-Sheet 4

March 2, 1971 S. E. TILBY 3,567,510
METHOD AND APPARATUS FOR SEPARATING COMPONENTS OF SUGARCANE
Filed Dec. 20, 1967 5 Sheets-Sheet 5
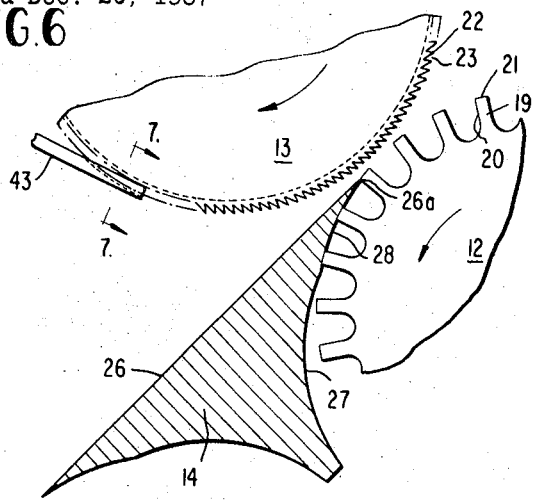
FIG.6
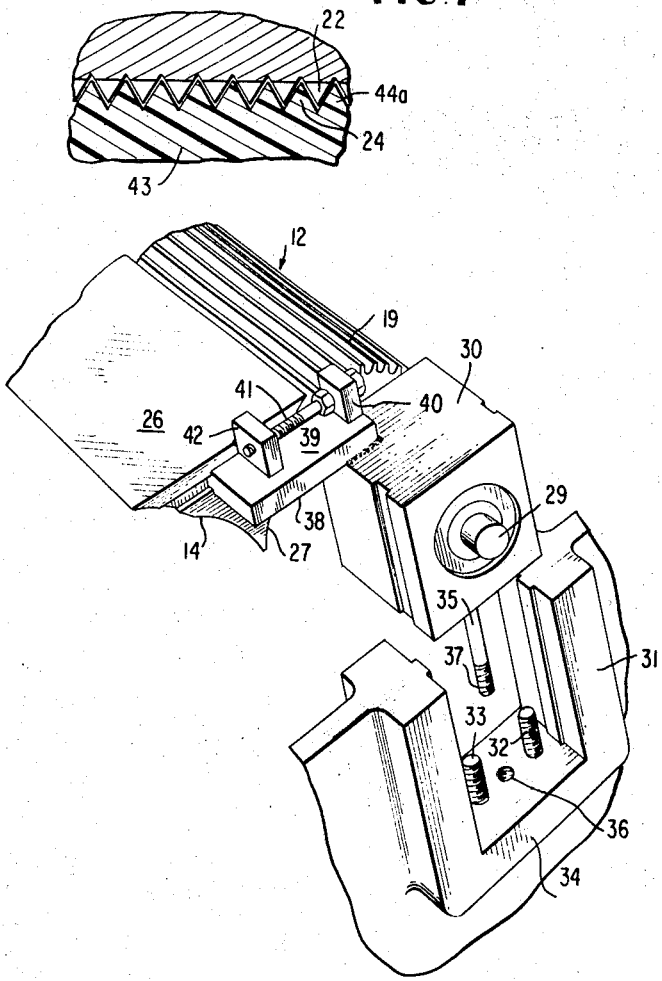
FIG.7
FIG.8
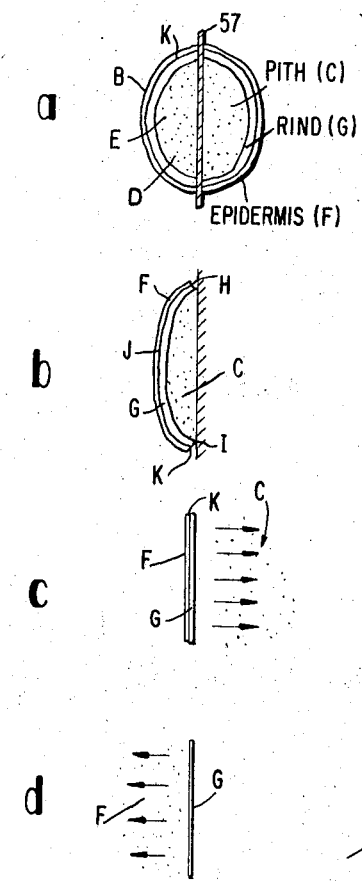
FIG.9

United States Patent Office 3,567,510
Patented Mar. 2, 1971

3,567,510
METHOD AND APPARATUS FOR SEPARATING COMPONENTS OF SUGARCANE
Sydney E. Tilby, Winterburn, Alberta, Canada, assignor to Canadian Cane Equipment, Ltd., Montreal, Quebec, Canada
Filed Dec. 20, 1967, Ser. No. 692,185
Int. Cl. C13c *1/00, 1/02;* C13d *1/02*
U.S. Cl. 127—2                                    19 Claims

ABSTRACT OF THE DISCLOSURE

Method and apparatus for separating the pith, rind and epidermis components of split sugarcane stalk. Each split stalk portion is flattened and milled on the pith side to separate pith from rind and milled on an opposite side to remove epidermis. While the milling away of pith and epidermis is being effected, the rind is maintained in a flattened condition and is positively engaged by rind, velocity-controlling, gripping means which partially penetrate the ring periphery. The rind milling apparatus is characterized by a milling roll having a plurality of generally radially extending milling ridges. Each milling ridge has a planar milling side parallel to a radial plane of the roll and a peripheral, arcuate, rind-contacting which intersects the planar milling side. The separator apparatus is constructed such that cooperating components of stalk feeding and milling units may be simultaneously separated. The separator apparatus is incorporated with component conveying and handling systems to facilitate the modular stacking of separator units. This modulator stacking increases plant capacity and facilitates a secondary separation of residual pith from rind, after the primary rind and pith separation has taken place.

---

Figure 5:
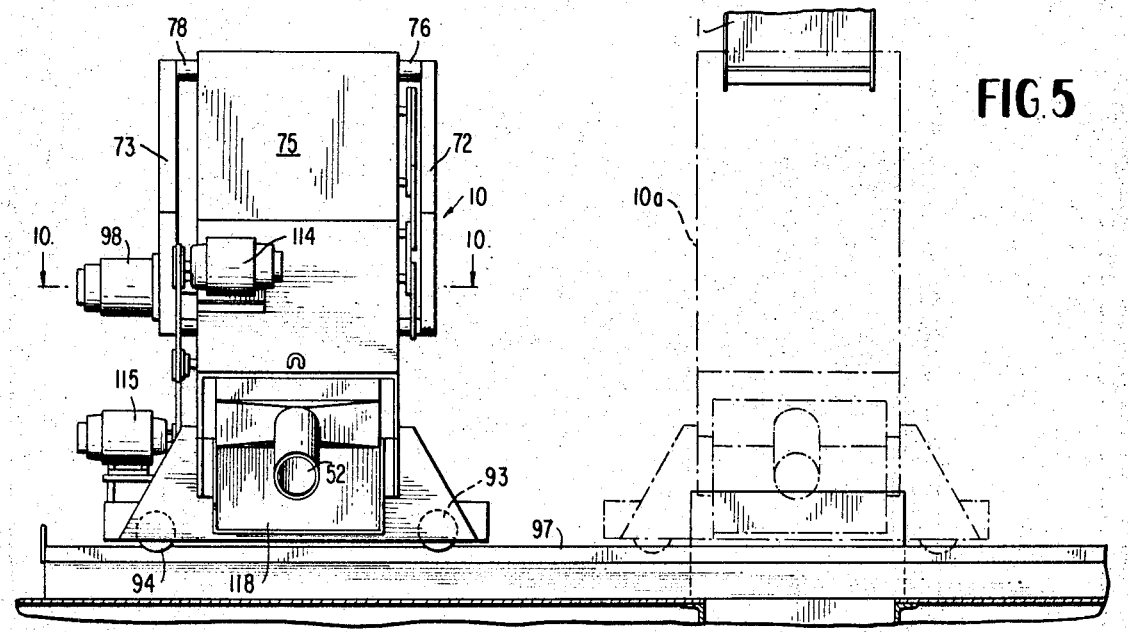

This invention relates to improved methods and apparatus for separating the pith, rind and epidermis components of sugarcane stalk.

In particular, it relates to such methods and apparatus uniquely adapted to separate the components of sugarcane stalk, which stalk is supplied as aligned short stalk lengths to a separator unit.

GENERAL BACKGROUND AND OBJECTS OF INVENTION

The broad concept of separating the pith and rind components of sugarcane was early recognized in the United States McMullen Pat. 1,040,559. However, the separation technique proposed by McMullen inherently contemplates complete disintegration of rind and the commingling of the disintegrated rind and pith. Rather obviously, the intermingling of shredded filamentary rind with disintegrated pith provides substantial separating problems. The magnitude of these problems is evidenced by the fact that the McMullen process has not become a technique commercially used for handling sugarcane stalk so as to enable its sugar content to be extracted.

A distinct advance in the art was provided by Robert Boothe Miller, who recognized that disintegration of sugarcane, as proposed by McMullen, and as is involved in conventional whole stalk crushing, it not the answer to effective pith and rind separation. Miller proposed the splitting of sugarcane stalk, followed by the scooping out of pith from stalk halves while maintaining the stalk halves in their curved configuration. Miller also proposed the removal of pith from partially flattened stalk halves with rotating brushes. However, structures for such scooping are relatively complex and brushes are prone to rapid wear. In addition, where brushing was employed by Miller, auxiliary equipment was required to flatten the rind ahead of the depithing zone. The miller contribution and technique is disclosed, for example, in the issued Dominican Republic Pat. 1184. The major breakthrough in sugarcane processing technology provided by Miller has opened the door to the development of improved commercial facilities for handling sugarcane stalk and separating its components.

The present invention recognizes the efficiency and production reliability involved in the utilization of milling equipment to effect the separation of both pith and epidermis from rind material. Milling, as here used, denotes rotary planing of a surface layer of split cane, as opposed to whole stalk crushing or disintegration.

Surface milling or planing rolls are structurally rugged, relatively simple to fabricate, service and maintain and yet unexpectedly efficient in separating the soft pith material from rind.

Initially, one would suspect that a miling roll would crush and dewater pith to an excessive degree and damage the rind fibers during the pith separating or milling operation. Also, one would suspect that a milling roll, when applied to the epidermis side of sugarcane rind, would damage the rind fibers during the epidermis separation operation. Unexpectedly, in practice, it has been found that such undesirable consequences do not in fact materialize and that milling provides a rapid, efficient technique for separating both pith and epidermis from the rind of sugarcane stalk.

It should also be recognized that patents such as the United States Heimlich Pat. 1,689,387, while not directed to sugarcane processing, have disclosed structures for removing pith from stalked plants. The Heimlich apparatus includes disc-like units provided with cupped, pith separating blades. However, Heimlich failed to recognize that the structural complexity of such cupped pith-removing units, which would be inherently potentially injurious to rind fiber bundles, could be eliminated in favor of simple planar milling faces. Additionally, Heimlich failed to recognize that milling could be accomplished while feeding and flattening sugarcane stalks in a planar or straight feeding path, and that milling could be effectively employed to remove epidermis from the outer side of sugarcane rind material. Heimlich also proposed structure which undesirably required the use of complex, rind bending guides to effect rind flattening ahead of a depithing zone.

The Heimlich structure is fairly representative of a wide variety of structures previously developed for separating the components of cornstalks. While such cornstalks separator structures have been in existence and known for sometime, those active in the sugarcane processing art have consistently ignored this technology and turned, instead, to conventional whole stalk crushing techniques. Thus, the application of separating apparatus as featured in the Heimlich patent to the separation of sugarcane stalk has been far from obvious over the several decades during which whole stalk crushing has been the accepted sugar extraction technique.

Other prior patents include the United States Bobkowicz Pat. 2,706,312 directed to the removal of material opposite sides of jute, kenaf and ramie fibers. The fiber structure, and indeed the overall structure, of material is such as jute, kenaf, and ramie are such as to present component separation considerations significantly different from those involved in the treatment of sugarcane stalk. This is evidenced, for example, by the fact that Bobkowicz wholly defiberizes material so as to produce a sheaf of fibrous strands, as opposed to unitary rind strips of substantially uniform cross-sections produced by the present invention.

It is a primary object of the invention to provide improved methods and apparatus for effecting the separation of pith and epidermis components from the rind component of sugarcane stalk by milling operations, while positively controlling the velocity of the rind material.

It is another principal object of the invention to provide improved methods and apparatus for effecting such a separation wherein cooperating elements of milling units and rind feeding units may be simultaneously separated so as to provide convenient and immediate access to the internal structure of separating equipment for servicing and maintenance purposes.

It is likewise a principal object of the invention to provide such separation methods and apparatus which entail a primary separation of pith and rind by milling and a secondary separation of pith from rind by concurrent shaking and screening.

Another principal object of the invention is to provide such methods and apparatus for separating components of sugarcane stalk which enable a separator unit to be selectively transported into or out of alignment with pith and rind receiving units.

It is a particular object of the invention to provide a novel milling unit for milling sugarcane stalk portions, which milling unit is characterized by a milling roll having planar milling sides on generally radially projecting and longitudinally extending milling ridges. Each unit also includes a rind-gripping roll having projections which transversely intersect the rind periphery so as to impede and thereby limit and control the velocity of the rind during the milling operation.

In accomplishing at least some of these objects, there is provided a method for separating the pith and rind components of sugarcane stalk which entails the feeding of sugarcane stalk material while maintaining the stalk material generally aligned with the feed direction. The stalk is opened up longitudinally while it is being fed. The opened-up stalk portions are separated and the separated portions are then flattened so that the rind component of each portion is confined, while passing through a zone, to a substantially flattened configuration. While the flattened stalk material portion is passing through the zone, pith is milled away from one side and the other side is gripped by holding surface means which partially penetrate the rind and extend transversely of the feed direction of the stalk portion.

Another method aspect of the invention entails the simultaneous flattening of stalk material portions and the milling of pith from one side of these portions, followed by the milling away of epidermis material from the opposite side of the stalk portion. This process yields generally unitary rind strips of substantially uniform cross-section.

Other independently significant facets of the invention involve combinations of structural means for implementing each of the previously described methods.

Still further independently significant facets of the invention involve apparatus wherein a stalk splitting blade and one of the gripping and milling rolls of each milling unit are carried by a relatively stationary base. The other of the gripping and milling rolls of this milling unit is carried by a wing which is pivotally mounted on the base. Thus, pivotal movement of the wing serves to separate the gripping and milling roll and provide immediate access to these rolls for servicing purposes.

Another independently significant aspect of the invention pertains to a milling roll which is characterized by a plurality of milling ridges. Each such ridge projects radially of the axis of rotation of the roll and has a planar milling side parallel to a radial plane of the roll. Each such ridge also has a rind-contacting periphery, curved in an arc having a radius extending to the outer radial periphery of the roll and intersecting the milling side.

Still another, uniquely significant, apparatus facet of the invention relates to a pith and rind separator apparatus including a pair of primary pith separating means, each operable to discharge pith into a pith-receiving zone disposed between a pair of rind-receiving conveyors. Rind discharged from each side of the separator is conveyed on rind-handling means, across the pith-receiving zone, toward a rind conveyor. The rind-conveying or handling means includes vibrating screen means for effecting a secondary separation of residual pith from rind, with the separated residual pith being collected in the primary pith-receiving zone.

DRAWINGS

In describing the invention, reference will be made to a preferred separator embodiment shown in the appended drawings.

In the drawings:

FIG. 1 schematically illustrates the manner in which sugarcane stalk is received from an aligning source and then separated into its major pith, rind, and epidermis components. This same schematic illustration shows the manner in which separated epidermis, rind, and pith components are subsequently themselves treated.

FIG. 2 provides an elevational, partially sectioned, view of a separator installation of the present invention, showing one part of the separator opened up for servicing or inspection purposes.

FIG. 3 provides an enlarged, partially sectioned, view of the entirely closed-up or operable separator of FIG. 2.

FIG. 4 provides an elevational view of the FIG. 3 separator at a reduced scale, viewing the separator from the side opposite to that seen in FIG. 3.

FIG. 5 provides an end elevational view of the FIG. 3 separator, viewing the separator from the left end of FIG. 2.

FIG. 6 provides an enlarged, partially sectioned, elevational view of a milling unit incorporated in the FIG. 2 and 3 separator and operable to separate rind and pith components.

FIG. 7 provides an enlarged, transverse, sectional view of a longitudinally extending portion of the rind-gripping roll shown in FIG. 6, as viewed along the section line 7—7.

FIG. 8 provides a perspective, "exploded" view of a milling roll, milling roll mount, and rind and pith supporting and deflecting unit incorporated in the FIG. 2 and 3 separator.

FIG. 9 provides a schematic, sequential illustration of the cross-section of a representative sugarcane stalk section, illustrating the changes which occurs to the stalk material during the various stages of the component separation operation.

FIG. 10 provides a transverse sectional view of a drive portion of the FIG. 2 and 3 separator as viewed along the section line 10—10 of FIG. 5.

FIG. 11 illustrates an alternative, stalk guiding and feeding arrangement which may be incorporated in the FIG. 3 showing of the separator and which is characterized by the addition of paired, stalk portion, feeding rolls immediately ahead of the pith milling unit.

Figure 12:
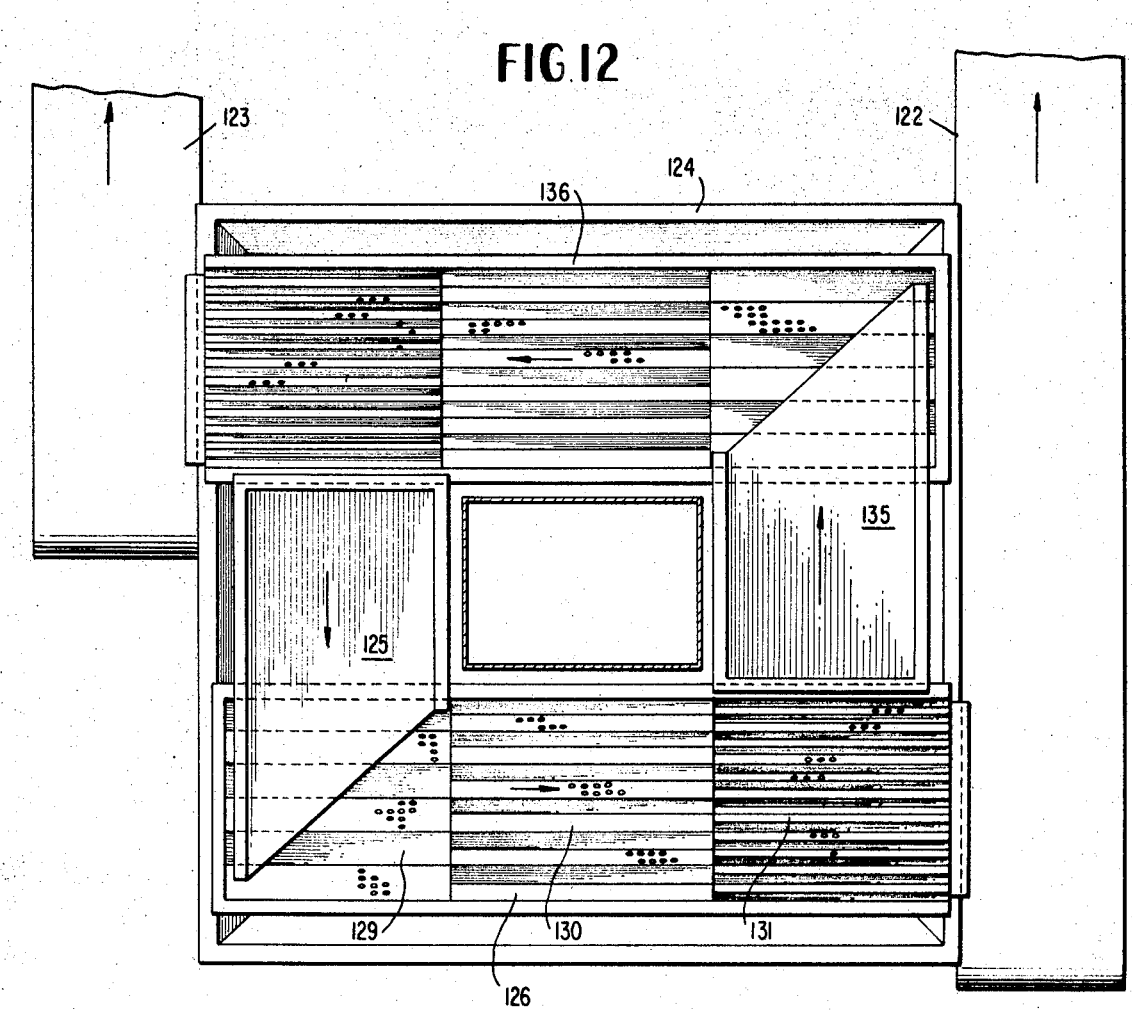

FIG. 12 provides a plan, sectional, view of the FIG. 2 separator, illustrating structural details of rind-handling apparatus, rind conveyors, and a centrally located, pith-receiving zone; and FIGS. 13, 14 and 15 provide transverse sectional views of various zones of a horizontally oscillating or vibrating rind-handling apparatus incorporated with the FIG. 2 separator and which serves to convey and screen rind and residual pith components.

OVERALL CANE-HANDLING OPERATION

FIG. 1 schematically illustrates the overall technique for handling sugarcane in accordance with the teaching of the present invention.

An example of a cane feeding device is shown in FIGS. 1, 2 and 3. In the illustrated apparatus, short sections of sugarcane stalk, chopped to a length of about ten inches, are fed along longitudinal pockets or grooves of a stalk-feeding slide or chute 1. Slide 1 comprises a base 2 and laterally spaced, longitudinally extending guide ribs or walls 3.

Slide base 2 is inclined downwardly and terminates in a substantially vertical discharge lip 4. Guide ribs 3 serve to maintain the short lengths of stalk material in longitudinal alignment with the direction in which the stalk lengths gravitate downwardly along the base 2. Thus, feeding device 1 provides at its discharge end 5 an outfeed of generally vertically oriented, short sugarcane stalks. Stalks are discharged from all of the series of horizontally displaced rows between the ribs 3.

It is contemplated that stalks being fed by the device 1 will be supplied in a substantially single layer form, even though plural, laterally displaced stalks may issue simultaneously from the discharge lip 4. However, it is contemplated that other cane feed devices may be employed.

The aligned, short stalk sections A are thus fed to a stalk component separator station 6. At this station, as shown schematically in FIG. 9a, the stalk portions are split longitudinally into two halves B. Each split half B is treated so as to separate the pith, rind and epidermis components without materially damaging the fibers of the rind component of each stalk half.

The pith component C of the stalk material separated from flattened rind in separator station 6, as shown schematically in FIG. 9c, is conveyed to a pith treatment station 7. In this treatment station, sugar-containing fluid is expressed from the pitch so as to yield sugar-containing fluid and cellulosic pith material of both a fibrous and non-fibrous nature. As will be understood, by reference to FIG. 9a, the pith core C of each stalk A includes a non-fibrous matrix D through which longitudinally extending fibrous elements E are dispersed. The separation of the pith layer from a flattened stalk half B is schematically shown in FIG. 9c.

The epidermis material F, separated by separator 6, which may include the wax component of the sugarcane stalk and which is schematically labeled in FIGS. 9a through 9d, may be subjected to further treatment in an epidermis treatment station 8. In station 8 the wax component may be separated from the epidermis material as such.

Rind material G separated in the separator station 6, and illustrated in FIGS. 9a through 9d, is conveyed to a rind treatment station 9. This material is substantially free of pitch and epidermis, as shown in FIG. 9d. Station 9 may serve to separate residual sugar as well as certain other soluble materials from the rind fibers.

This invention is concerned primarily with the methods and apparatus employed at the separator station 6.

FUNCTION OF SEPARATOR STATION

The separator station 6 is designed to effect a physical separation of epidermis, rind and pith components of sugarcane.

A description of the characteristics of these components is set forth in the Dominican Republic Pat. 1182 of Robert Boothe Miller.

Suffice it to say that pith, as used in this disclosure, relates to the core material of sugarecane, including both the fibrous constituent E and the non-fibrous constituents D.

Epidermis material F is that material found in the outer periphery of sugarcane stalk which is comprised of fine, relatively loose and often colored fibers. Usually cutical wax adheres to the outer epidermis layer.

Sugarcane rind G is made up of fiber bundles, the fibers of which extend longitudinally of the stalks.

The overall function of the separator station 6 is to produce a separation of the pith and rind components without damaging the rind fibers or impairing the pith as a source of sugar.

The epidermis removal is also intended to be performed without damaging the rind fibers.

The separation of sugarcane stalk components previously described is effected in a separator unit 10. In describing the separator unit 10, the structure and operation of various key elements of the separator will be individually considered prior to discussing the overall assembly of the unit.

PITH SEPARATION

Pith separation unit 10 includes a pith separation unit 11 as shown generally in FIGS. 3 and 6 through 9.

Pith separation unit 11 includes a pith milling roll 12, a rind-gripping roll 13, and a rind-supporting and pith-deflecting shroud 14.

Milling roll 12 and gripping roll 13 are mounted for rotation on parallel axes 15 and 16.

Cane stalks are fed longitudinally into the nip zone 17 between the rolls 12 and 13. The cane stalk material supplied to the nip zone 17 is in the form of longitudinally split cane portions B, i.e., one longitudinally extending half of a chopped cane length. The cane halves may be fed along a planar guiding surface 18.

Split cane stalk portions moving along surface 18 are oriented with the pith side facing the surface 18 and the rind side facing upwardly as shown in FIG. 3. Desirably, surface 18 supports the thus positioned stalk sections so that the rind portion moves into the nip zone 17 substantially tangentially of the outer periphery of the milling roll 12.

Milling roll 12 includes a purality of generally radially projecting longitudinally extending, peripheral milling ridges 19. Each milling ridge 19 extends longitudinally of the periphery of the roll 12 and includes a pair of planar, parallel, symmetrically disposed, milling, side faces 20. Each milling face 20 is parallel to a radial plane of the roll 12, i.e., raked neither forwardly or rearwardly.

Milling ridge 19 also includes a circumferentially curved, longitudinally extending, rind-gripping periphery 21. Peripheral face 21 is curved in an arc having a radius equal to that extending to the outermost radial periphery of the ridge 19, which periphery defines the outermost radius of the roll 12. Curved, rind-contacting surface 21 intersects each planar milling side 20.

Gripping roll 13 is fabricated so as to include a plurality of rind-gripping teeth 22 raked rearwardly of the direction of rotation of the roll 13 as shown in FIG. 6.

Rind-gripping teeth 22 are defined in part by a series of longitudinally extneding V-shaped cuts 23 which extend longitudinally of the outer periphery of the roll 13 and which are raked or inclined rearwardly of the peripheral direction of movement of the roll 13.

A series of longitudinally spaced, circumferentially extending, annular grooves 24 are also cut in the outer periphery of the roll 13 to complete the forming of teeth 22. The depths of these grooves 24 slightly exceeds the depth of the grooves 23 as shown, for example, in FIG. 7.

The intersections of the grooves 23 and 24 produce needle-like, rind-gripping teeth 22 inclined rearwardly of the feed direction on the outer periphery of the roll 13.

As shown in FIG. 6, the teeth 22 are spaced somewhat from the rind-contacting surfaces 21. This spacing is such as to ensure that the teeth 22 will partially penetrate the epidermis side of the rind, while the gripping surfaces 21 of the milling roll 12 are engaging the pith side of the split stalk material.

The rotary speed of the milling roll 12 substantially exceeds that of the gripping roll 13. Thus, split stalk portions moving into the nip zone 17 and between the rolls 12 and 13 will be simultaneously gripped and depithed, and the high rotary velocity of the milling roll 12 will ensure that the milling sides 20 of the milling ridges 19 perform a thorough pith milling or removing function. The teeth 22, which partially penetrate the rind portion of the split stalk sections, will function as holding surface means, transversely intersecting a portion of the rind so as to positively hold the rind and limit its velocity to the peripheral speed of the gripping roll. The milling or planing roll surfaces 21 will lightly press the rind against the teeth 22 of the gripping roll. This pressing will cause the teeth to partially penetrate the rind without doing any significant damage to the fibers of the rind strip.

Rind which issues from the area 25, i.e., the downstream side of the rolls 12 and 13, has had pith removed by the milling roll 12. This depithed rind is supported in its tangential movement away from the rolls 12 and 13 by a planar supporting surface 26. Supporting surface 26, comprising a portion of shroud 14, is generally tangentially aligned with the outer periphery of the milling roll 12, at the common radius of the milling roll 12 and gripping roll 13. However, it may be desirable to displace the planar supporting surface 26 somewhat inwardly of this tangential location, toward the axis 15, so as to positively ensure that depithed rind will not abuttingly engage the leading end 26a of this supporting surface as it moves toward shroud 14.

Pith removed by the milling sides 20 is deflected by a curved deflecting surface 27, also comprising a portion of shroud 14, and extending downwardly and away from the rind-supporting surface 26. A portion 28 of deflecting surface 27 may be curved in an arc conforming to the radius of gripping surfaces 21 of roll 12. As shown in FIG. 6, shroud 14 has a symmetric, "butterfly" shaped cross-section so as to be reversible in its mounting.

As the split stalk sections B move into the nip zone 17, the converging peripheries of the rolls 12 and 13 will tend to induce a flattening of the rind layer G into a substantially planar configuration as shown generally in FIG. 9c. This flattening will result from engagement of milling ridge extremities 21 with rind edges H and I, concurrent with engagement of rind-gripping teeth 22 with the outermost stalk periphery J.

Thus, as the stalk half B moves forward into the nip zone 17, the rind layer G will be progressively flattened until, in the zone where the radii of rolls 12 and 13 are radially aligned, the rind will be completely flattened. This flattening, in sequence, is shown in FIGS. 9b and 9c, the rind being gripped on the epidermis side by the rind-penetrating teeth 22 while pith is being milled away from the opposite side by the milling ridge sides 20, as shown in FIG. 9c.

Even if stalk halves B should engage the nip zone 17 so as to be skewed, i.e., not longitudinally aligned with the feed direction, the rolls 12 and 13 will still be able to effect an efficient milling action. Since the rolls 12 and 13 each rotate in the feed direction of the stalk sections B, as indicated by appropriate rotation direction arrows in FIGS. 3 and 6, the corner of a skewed stalk section which first enters the nip zone 17 will be engaged by the periphery of the milling ridges 19 so as to enable the rind-flattening action previously described to take place.

Even where a stalk half B is received which is greater in width than a half of the full stalk from which it is derived, the milling unit 12 and 13 is able to effect rind flattening and pith milling. Where a stalk portion B is received which has edges H and I curled under, as would result where the portion B is greater in width than the width of a half stalk portion, the milling ridges 19 will mill the end of the stalk portion B entering the nip zone 17. This milling will form an arcuate, milled zone extending from the rind periphery J arcuately, in an upstream direction, to the rind edges H and I. This milling of an arcuate end of the stalk portion B will enable the milling roll 12 and rind-gripping roll 13 to nippingly engage the rind extremity J in advance of the rind edges H and I. This will enable the rolls 12 and 13 to progressively flatten or uncurl the rind layer D as the oversized split stalk portion B is fed between the rolls 12 and 13.

FIG. 8 illustrates adjustable mounting arrangements for the milling roll 12 and shroud 14.

Each end of a shaft 29 which supports the roll 12 is journaled in a bearing block 30. Bearing block 30 is adjustably mounted in a frame-defined recess or pocket 31. The position of bearing block 30, and thus the position of axis 15 of the shaft 29 and roll 12, is determined by the position of threaded and selectively adjustable, abutment pins 32 and 33 threadably mounted in a lower edge portion 34 of block pocket 31.

Bearing block 30 may be provided with a securing pin 35 which passes through an opening 36 in the ledge 34. Pin 35 may have a lower threaded end 37 which will enable the rod to be engaged with a threaded nut 37a (shown, for example, in FIG. 3). With this arrangement, the bearing block 30 may be clamped against the position-defining, adjustable abutments 32 and 33.

As will be appreciated, by appropriately adjusting the position of the threaded pins 32 and 33 within the bearing pocket 31, the position of the axis 15 may be selectively adjusted.

The bearing block 30 at each end of the roll 12 also supports a shroud mounting and adjusting bracket 38.

Each adjusting bracket 38, as shown in FIG. 8, includes a base plate 39 fixedly secured to its associated bearing block 30. A mounting ear 40 projects upwardly from the plate 39. A threaded adjusting rod 41 is journaled in the ear 40. The threaded end of rod 41 threadably engages an apertured ear 42 extending from and connected with one end of the shroud 14.

By thus manipulating the threaded adjusting rods 41 on each of the bearing blocks 30 associated with the milling roll 12, the shroud 14 may be selectively moved toward and away from the milling roll 12.

When the shroud 14 is moved into actual physical engagement with the outer periphery of the roll 12, the curved surface 28 will coincide with the curved plane of the surfaces 21. This form of conforming engagement will positively prevent the leading edge 26a of the shroud from engaging milling side 20 as the position of the shroud 14 is selectively adjusted.

It will be understood that gripping roll 13 is mounted in bearing blocks similar or identical to bearing blocks 30, which bearing blocks are adjustably mounted in a frame as generally described in connection with the mounting of the milling roll 12. Further, as an alternative, only the gripping roll 13 may be adjustably mounted while the milling roll 12 is held in a fixed position relative to the frame.

As split sugarcane stalk material is passing between the rolls 12 and 13, there may be a tendency for fibrous detritus to accumulate between the teeth 22 of the gripping roll 13. In order to prevent a buildup of such detritus on the gripping roll 13, a detritus-removing nylon blade 43 may be provided. As schematically shown in FIG. 3, blade 43 is mounted in generally tangential engagement with the gripping roll 13, above the outfeed area or zone 25. Blade 43 may be provided with fingers operable to project into the circumferential groove 24 and remove detritus. These fingers may be formed by merely pressing the edge 44 of the blade against the periphery of the roll 13, such that the teeth 22 grind into the edge 44 and form detritus-removing fingers 44a extending into the grooves 24. After these fingers 44a have thus been formed, the blade 44 may be positioned so as to prevent undue binding between these detritus-removing fingers and the periphery of the roll 13. As will be appreciated, the grooves 24, being deeper than the grooves 23, will facilitate the ability of fingers 44a to remove debris from the most likely to become clogged grooves 23.

Detritus removed by the fingers 44a is discharged downwardly onto the rind-supporting surface 26. This finger-removed detritus is carried along with the ring moving on the surface 26 to the epidermis-removing station to be subsequently described.

EPIDERMIS SEPARATION

With the pith component C of the split stalk section having been removed, the epidermis-containing rind is now conveyed along the rind-supporting surface 26 of the shroud 14 to an epidermis-removing unit 45.

As will be understood, epidermis-containing rind issuing from the zone 25 will be traveling with a velocity sufficient to enable the rind to continue along the surface 26 until it is grippingly engaged by the elements of the separator unit 45.

Epidermis-removing unit 45 includes a gripping roll 46 and a milling roll 47. Gripping roll 46 is identical to gripping roll 13 except that it is mounted on the underside of the flow path of the stalk material, with the milling roll 47 mounted on the top, epidermis bearing, side of the stalk material.

Roll 47 is structurally identical to milling roll 12, except that the radial depth of the ridges 19 and the circumferential spacing between the ridges 19 may be diminished. This diminishing of dimensions of the milling ridges 19 is possible because of the relatively thin character of the epidermis layer in relation to the relatively thicker pith layer.

Rolls 46 and 47 are disposed for rotation about spaced parallel axes 48 and 49 respectively. Axes 48 and 49 are parallel to axes 15 and 16 of rolls 12 and 13.

As illustrated in FIG. 3, axes 48 and 49 are disposed in a plane which is perpendicular to the plane of the rind-supporting surface 26 of shroud 14. This is similar to the arrangement of the axes 15 and 16 in a plane perpendicular to the surface 18. Surface 26 is arranged so as to supply rind to the nip zone 50 of rolls 46 and 47, with the junction K between the rind and epidermis layer (see FIG. 9c) being substantially tagential with the outer extremity of the milling ridges of the milling roll 47.

The radial spacing between the milling ridges of the milling roll 47 and the gripping teeth of the gripping roll 46 is such as to ensure that the teeth of the gripping roll 46 partially penetrate the underside of the rind, while the ridges of the milling roll grip the opposite side of the rind and mill away epidermis material.

Thus, as the epidermis milling operation proceeds, the gripping roll 46 serves to positively control the velocity of the rind. This enables the milling roll 47 to rotate in the feed direction of the stalk material at a substantially faster rate than the gripping roll 46. In this fashion, a high velocity of the milling ridges of the roll 47 is made possible so as to produce a complete and efficient epidermis removal as the stalk material proceeds through the epidermis-removing unit 45.

As will be appreciated, the depithed rind material, moving into the nip zone 50, is maintained in a flattened condition as it is engaged for the epidermis removing operation by the rolls 46 and 47. The longitudinally extending milling ridges of the milling roll 47, in cooperation with the teeth of the gripping roll 46, provide a rind-flattening action which ensures that the rind layer D is maintained in a flattened condition while the epidermis material is being removed, as shown generally in FIG. 9d.

It will also here be appreciated that the milling way of epidermis and pith by the radially extending milling ridges of the milling rolls 12 and 47 is restricted in milling depth. These ridges extend uniformly across the travel path of the rind strips and mill to a substantially uniform depth across the strips so as to yield substantially planar, unitary strips of sugarcane rind having a generally uniform thickness. Within each rind strip, the bulk of rind fibers are intact, substantially undisturbed, and unitized or connected with adjacent fibers.

The epidermis material removed by the roll 47 is light and fluffy in character. Because of its light and fluffy character, the epidermis material which has been removed by the milling roll 47 may be conveyed away from the separator unit 10 by a vacuum-induced fluid stream.

Thus, as shown schematically in FIG. 3, a vacuum hood 51 may partially surround the milling zone defined by the milling roll 47. A vacuum-induced flow of air within the hood 51 enables epidermis material, which has been milled away from rind, to be conveyed away from the hood 51 through a conduit 52.

As will be appreciated, the vacuum-induced air flow within the hood 51 will also serve to convey away detritus removed by the fingers 44a. Such detritus material is carried along with rind material on rind-supporting surface 26 to the epidermis-removing unit 45.

A detritus-removing nylon blade 53, identical to blade 44, may be associated with the gripping roll 46.

As shown in FIG. 3, the detritus-removing blade 53 is positioned so as to extend generally tangentially of the gripping roll 46, in generally transverse alignment with the rind feeding direction. As shown, the blade 53 may be displaced somewhat toward the gripping roll axis 48.

As is also shown in FIG. 3, a shield 53a may be interposed between rolls 12 and 46. This shield will prevent material removed by roll 12 from splattering against the underside of roll 46.

Each of the rolls 46 and 47 may be mounted for selective adjustment in bearing blocks in a manner described in connection with the milling roll 12, or only one roll may be mounted for adjustment.

CANE FEEDING AND SPLITTING

FIG. 3 schematically demonstrates the structure for receiving stalk sections from the slide or chute unit 1.

Bearing in mind the previous description, it will be recalled that rind is discharged from a feed unit so as to be oriented in a generally vertical posture.

Usually a plurality of laterally separated, chopped stalk sections are fed into the nip zone 54 of a splitting unit 55. Splitting unit 55 includes a whole stalk section, splitting blade 56. Blade 56 has an upwardly facing and horizontally extending stalk splitting edge 57. A pair of split stalk portions, deflecting surfaces 58 and 59, diverge downwardly away from the stalk splitting edge 57.

As shown in FIG. 3, deflecting surface 58 may comprise a curved planar surface which extends downwardly and merges with the flat, planar, split stalk feeding and supporting surface 18.

Interposed vertically between the splitting edge 57 and the slide unit 1 are a pair of whole, chopped stalk, feeding rolls 60 and 61. Each of these rolls is mounted for rotation about a horizontal axis. The horizontal axes 62 and 63 of rolls 60 and 61 are spaced on opposite sides of the edge 57 and are aligned in a horizontal plane spaced slightly above the edge 57.

Each feed roll 60 and 61 is provided with a cylindrical, resilient, peripherally roughened, periphery fabricated, for example, from peripherally threaded rubber or other elastomeric material. These cylindrical peripheries 64 and 65 of rolls 60 and 61, respectively, are radially and horizontally spaced in the nip zone above the splitting edge 57. This spacing is less than the anticipated minimum width of a whole cane stalk section being split by the slide unit 1.

With this arrangement, whole stalk is fed into the nip zone 54 between the resilient, peripheral portions 64 and 65 of the feed rolls. This whole stalk, which is substantially vertically aligned, is resiliently engaged by the roll coverings 64 and 65 and grippingly held while it is fed downwardly in a vertical direction into splitting engagement with the edge 57, as shown generally in FIG. 3. The resilient roll coverings 64 and 65 will be flattened because of their compressive engagement with the whole stalk portions. This flattening will produce a resilient stabilizing action tending to maintain the whole stalk in near perfect vertical alignment with the splitting blade 57. Forces generated by the splitting action of the blade edge 57 which might tend to cause skewing of the whole stalk out of this vertical alignment will be resisted by the flattened portions of the roll coverings 64 and 65. These flattened portions 64a and 65a, shown in FIG. 3, yieldingly and grippingly engage the whole stalk as it is being fed into splitting cooperation with the blade edge 57.

As is shown in FIG. 3, one or more water nozzles 66 may discharge small amounts of water onto stalk material being fed into the splitting unit 55. This water may be advantageous in tending to minimize the generation of dust and effect lubrication of the cane material so as to increase the efficiency of the pith and epidermis milling operation.

The stalk material A, after being split in two by the edge 57, is deflected so as to travel along the deflecting surfaces 58 and 59. One stalk half B will travel along the deflecting surface 58 and the other will travel along the deflecting surface 59.

Each split stalk section B travels along its associated deflecting surface, with the exposed pith C facing the deflecting surface.

Continued movement of the split cane portions B along the deflecting surface may be enhanced by feeding and guide rolls such as the rubber-covered, driven rolls 67, 68 and 69 shown schematically in FIG. 3. Each of the rolls 67, 68 and 69 is mounted for rotation about an axis parallel to the deflecting surface 58 and parallel to the axes 62, 15, 16, 48 and 49.

Alternatively, the FIG. 3 apparatus may be modified by the addition of a feed roll 70 disposed beneath the feed roll 69. Feed rolls 69 and 70 are spaced so as to provide a nip feeding zone 71 through which the split cane sections pass. Split cane passing through nip zone 71 is resiliently nipped by the feed rolls 69 and 70 and positively impelled into the nip zone 17.

As shown in FIG. 11, where the auxiliary feed roll 70 is employed, the guide surface 18 must be spaced from the lower edge of the deflecting surface 58 so as to leave an open, nip-defining gap between the rolls 69 and 70.

MOUNTING FOR PITH AND EPIDERMIS SEPARATING UNITS

FIGS. 2 through 5 illustrate a uniquely effective arrangement for mounting the pith separator unit 11 and the epidermis unit 45 in a unitary housing.

Separator 10 includes a generally V-shaped base unit 71. A pair of vertically extended, fixed wings 72 and 73 extend upwardly from the sides of base unit 71.

Separator 10 includes a pair of movable wing members pivotally mounted on the separator base 74. This base 74 is defined by the assembled V-shaped base unit 71 and its associated, horizontally spaced, vertically extending, fixed wing units 72 and 73. One movable wing unit 75 is pivotally attached to fixed wing units 72 and 73 by pivot mounting means 76. Pivot mounting means 76 may comprise a pivot shaft extending between the wing units 72 and 73 and supporting the wing 75, or may comprise stub axles extending between the wing unit 75 and the two base wings.

Another movable wing unit 77 is connected by pivot means 78 between the upper corners of fixed wing units 72 and 73.

As illustrated, wings 77 and 75 are disposed on opposite ends of the separator apparatus, with each wing being mounted for vertical pivotal movement away from or toward a portion of the V-shaped base unit 71.

As schematically shown in FIG. 3, the splitting blade 56 is mounted between the base wings 72 and 73 with the mounting rods 79, 80 and 81. Pith milling roll 12 and epidermis gripping roll 46 are mounted in one leg 82 of the base unit 71, as shown in FIG. 3.

Epidermis milling roll 47, rind-gripping roll 13, feeding and guiding rolls 67, 68 and 69, as well as main feeding roll 64, are also mounted on wing unit 75.

Where the auxiliary feeding roll 70 is used, it is mounted on the base unit 71.

Pivot means 76 is located such that, when the wing 75 is moved upwardly, the feeding roll 60 is moved away from the feeding roll 61 simultaneously with movement of the rolls 13 and 47 away from the rolls 12 and 46. At the same time, the guiding rolls 67, 68 and 69 are moved away from the rind-deflecting surface 58.

Thus, in one pivotal movement of the wing 75, the various elements of the separator 10 which engage opposite sides of split stalk material are simultaneously separated so as to provide immediate access to all operating components of the separator.

Movable wing 77 (which is mounted on the end of separator 10 opposite the wing 75) and base leg 83 of the V-shaped separator base 71 cooperate to support separator components corresponding exactly to those supported by the wing 75 and the base leg 82. Thus, the right, unsectioned, portions of FIG. 3 constitute essentially a mirror image of the sectioned, left-hand portion insofar as the components of the stalk feeding, splitting, depithing and epidermis removal components are concerned.

Separating movement of wing 75 and base leg 82 may be effected by a pneumatic piston and cylinder assembly 84. Thus, as shown in FIG. 2, the piston rod 85 of this assembly may be pivotally connected by pivot means 86 to the wing 75, while the cylinder 87 of the assembly is pivotally connected by pivot means 88 to the base leg 82. This piston and cylinder assembly, when extended, functions to separate the wing 75 from the base 82. Contraction of the assembly serves to restore the wing and base and its associated operating components to the stalk component splitting and separating posture shown in FIG. 3. Fluid biasing the piston in the assembly 84 may provide a wing clamping or holding action.

Alternatively, an overhead electric hoist 89 may be employed to raise one or both of the wings of the apparatus 10. Thus, as shown in FIG. 2, an electric hoist 89 is provided with a hook 90 which engages the wing 77.

This hoist 89 may be used to raise the wing to the position shown in FIG. 2 or restore the wing to its closed position, schematically illustrated in FIG. 3. If desired, a threaded clamping means 91 may be employed to secure either or both of the wings to their associated base legs.

Base 71 of the separator unit 10 may be provided with wheel units 92, 93, 94 and 95 at each of its corners. These wheel units are mounted upon V-shaped tracks or rails 96 and 97. With this mounting, the separator unit 10 may be selectively moved into and out of alignment with the rind material splitting chute 1. Thus, where the unit 10 needs to be serviced, it may be moved on tracks 96 and 97 out of alignment with the chute. An alternative separator unit 10a may then be moved into operating cooperation with stalk material supplying chute 1. With this shuttle track mounting of the separator units, the separation operation may remain continuous even while servicing of the one separator unit is taking place.

DRIVE MECHANISM FOR SEPARATOR

FIGS. 3, 4, 5 and 10 schematically illustrate one drive mechanism which may be effectively employed in the apparatus 10. This drive mechanism includes a wing-mounted motor 98 which is mounted on fixed wing 73. A drive shaft 99 projects through base 71 into a gear mechanism 100 contained between wing 72 and base 71.

Gear mechanism 100 includes a drive gear 101 driven by shaft 99 and a driven shaft 102 operated by a gear 103 meshingly engaged with gear 101. Another driven shaft 104 is driven by gears 105 and 106 mounted on shafts 102 and 104 and meshingly engaged, as shown in FIG. 10.

A sprocket chain 107 driven by shaft 102 extends to a sprocket wheel 108 mounted on pivotal wing 77. Sprocket wheel 108 is connected in driving engagement with feeding roll 61. A series-type, sprocket wheel and sprocket wheel drive arrangement 109 extends from sprocket wheel 108 to sprocket wheels on wing 77 which drive feeding rolls which are counterparts of feeding rolls 67, 68 and 69 of the other wing 75.

This same sprocket wheel and sprocket chain drive system 109 extends to the rind-gripping roll of wing 77 which is counterpart to the gripping roll 13 of wing 75.

A sprocket chain 110 of shaft 104 extends to a sprocket wheel and sprocket chain driving arrangement on wing 75 which serves to interconnectingly drive the feeding roll 60, the feeding and guiding rolls 67, 68 and 69, and the gripping roll 13 in exactly the same manner described in connection with the counterpart components of wing 77.

A sprocket chain 111, driven by shaft 104, extends to a sprocket wheel 112. Sprocket wheel 112 is mounted on base 71 and serves to drive the gripping roll on base leg 83, which is the counterpart of the gripping roll 46 on the base leg 82.

Sprocket chain 113 extends from shaft 102 to drive the rind-gripping roll 46 in exactly the same manner that the chain 111 serves to drive the sprocket wheel 112.

Each of the milling rolls 12 and 47, and their counterparts on wing 77 and base leg 83, may be driven by individual electric motors and wheel and drive belt assemblies. One such motor and drive belt assembly 114 mounted on wing 75 serves to independently drive milling roll 47. Another such motor and drive belt assembly 115 mounted on base 71 serves to drive depithing milling roll 112. Another such independent motor and drive belt assembly 116 serves to drive the epidermis-removing milling roll of wing 77, while an independent motor and drive belt mechanism 117 functions to drive the depithing milling roll carrier by the base leg 83.

With this arrangement, each milling roll is independently driven while the remaining gripping and feeding and guiding rolls of the apparatus are driven by a unitized drive system.

The milling rolls, while rotated at the same speed, rotate at a substantially higher speed than their related gripping rolls. This ensures that the pith-removing ridges are moving relative to the "in-transit" rind so as to effectively plane or mill away a stalk component.

Through appropriate sizing of gears and sprocket wheels, the peripheral speed of the interconnected drive roll 60, feeding and guiding rolls 67, 68 and 69, and gripping rolls 13 and 46, in this order, are driven at slightly increasing velocities. This ensures feeding of stalk material through the separating unit 10 at an increasing velocity, to eliminate jamming within the unit.

Obviously, alternative and more complex arrangements may be employed. However, the concept of unitizing the entire drive system, but for the milling rolls, is believed to be uniquely advantageous and efficient.

HANDLING OF SEPARATED STALK COMPONENTS

Stalk material A entering the separator 10 at feed nip 54 is split by knife edge 57 into stalk half portions B, as shown in FIG. 9a. Each stalk half portion is flattened, as shown in FIGS. 9b and 9c, and then milled, as shown in FIG. 9c, so as to effect the removal of pith and further milled, as shown in FIG. 9d, to remove epidermis.

Stalk halves B passing through wing 75 and its associated base leg 82 are separated into components with the epidermis being pneumatically conveyed away through conduit 52, and the rind strips, substantially freed of epidermis and pith, being discharged onto a trough 118. Pith, separated from the rind in the pitch separator unit 11, gravitates downwardly through an open passageway 119 formed in the base 71 immediately beneath the milling rolls on each end of the separator 10. The deflector surfaces 27 associated with the shroud of each pith milling unit at each end of the apparatus serve to deflect pith into the passageway 119.

Rind removed at the other end of the separator 10, between the wing 77 and base 83, is discharged in a trough 120, while separated epidermis material is pneumatically conveyed away through a conduit 121.

FIGS. 2, 4 and 12 through 15 illustrate auxiliary apparatus designed to effectively collect separated pith and rind components and facilitate the modular utilization of separator units 10.

As illustrated in these figures, the rails 96 and 97 extend longitudinally between rind-conveying, endless belts 122 and 123. The separator 10 is positioned on these rails between and above the rind conveyor belts 123, with the pith-receiving passage 119 having its open lower end disposed above a pith-receiving hopper or zone 124.

Rind discharged from trough 118 falls onto a conveying plate 125. Conveying plate 125 extends parallel to the conveyors 123 and 122 and is mounted for oscillating movement parallel to these conveyors. In other words, rind-receiving plate 125 functions as a conventional shaker conveyor, being mounted on pivot arms for simultaneous upward movement in the feed direction shown in FIG. 12, on a rapid oscillatory basis.

This conventional "shaker" action will move rind along the plate 125 to the aligning and pith-separating, rind-handling unit 126 which extends generally from the vicinity of plate 125 to rind conveyor 122.

Rind-handling unit 126, which performs a secondary separation of residual pith from rind, is mounted on pivot mounts 127 and 128 for upward movement in the direction of feed shown in FIG. 12, again on a rapid oscillatory basis. This shaker-type feeding action may be effected by a connecting rod 128 eccentrically mounted on the drive shaft of a motor, not shown. Obviously, this same arrangement of pivot mounts and driving rod may be employed to support the shaker conveyor 125 for rapid vibrating or oscillating movement.

Secondary separator 126 includes a series of progressively lower elevated, laterally divided sections 129, 130 and 131.

Each of the sections 129, 130 and 131 is fabricated from screen defining, perforated sheet metal, bent to form a series of transversely extending triangular pockets.

As shown in FIG. 13, the perforated base 132 of section 129 provides three such triangular pockets. As shown in FIG. 14, the base 133 of section 130 provides six such triangular pockets. As shown in FIG. 15, the perforated base 134 provides twelve such triangular pockets.

The triangular cross-section of longitudinally extending pockets in each of the sections 132, 133 and 134 serves to orient the rind strips longitudinally of their feed direction. The progressive increase in the number of triangular, rind-orienting pockets, coupled with the illustrated progressive diminishing of the depth of the pockets, enables the rind to undergo lateral spreading at the junction between each section, as the rind is moved along separator 126. Thus, rind material discharged from a single pocket of section 132 will be distributed laterally into two pockets of section 133. A similar lateral spread of rind will occur when rind material is discharged from section 133 onto section 134.

The shaking of the rind-handling unit 126 will tend to shake loose the limited amounts of residual pith which cling to the rind after the milling operation. This shaken-free pith will fall by gravity through the screen-defining walls 132, 133 and 134 into the pith-receiving zone 124. The thus-freed rind will be discharged from the rind-handling, shaker conveyor 126 onto the principal rind conveyor 122. However, as will be appreciated, the separation achieved by the milling rolls is of sufficient efficiency for many operations. The second "shaking" separation may be avoided.

An identical technique is employed for handling the rind strips which issue from the trough 120. These strips are discharged onto an imperforate, shaker conveyor 135 identical to the conveyor 125. Conveyor 135 is mounted for oscillating movement so as to convey the rind strips in the direction shown in FIG. 12. Rind strips are discharged from the shaker conveyor 135 onto the longitudinally cascading, triangularly sectionalized and perforated, rind-handling conveyor 136. Rind-handling conveyor 136 is identical to conveyor 126, but mounted for oscillatory movement so as to convey rind strips in the direction shown in FIG. 12 to rind outfeed conveyor 123.

As shown in FIG. 2, rails 96 and 97 may be mounted on a floor 137 of an installation. Shaker conveyors 125 and 135 are mounted on framing, not shown, at a level beneath the floor 137. Shaker conveyors 126 and 137 are mounted, in turn, beneath the level of conveyors 125 and 135. Similarly, conveyors 122 and 123, as well as the mouth of the pith-receiving hopper 124, are disposed beneath the elevation of the shaker conveyors 126 and 136.

As will thus be appreciated, rind is continuously fed away from the separator unit 10 on parallel conveying units 122 and 123. Pith resulting from the primary and secondary separations is collected in the centrally located, pith-receiving zone 124.

The rind-handling shaker conveyors each "wrap around" half of the separator unit so as to conserve on space between the rind conveyors 122 and 123, and enable the secondarily separated pith to be collected in the same zone where the pith is collected from the primary separation by milling.

As will be apparent, the railway mounting of the separator unit, coupled with the parallel rind conveyor belts 122 and 123 and the central pith-receiving zone, enables separator units to be modularized, i.e., arranged side-to-side on the tracks 96 and 97. This "stacking" enables plant capacity to be extended as desired, depending solely on the number of separator units mounted in operational relation on the common tracks 96 and 97.

MAJOR ADVANTAGES AND SCOPE OF INVENTION

A principal advantage of the invention resides in the utilization of the disclosed milling rolls as devices for removing both the epidermis and rind components of sugarcane stalk. The essentially radial and planar milling ridges of these rolls provide an easy to fabricate, yet structurally rugged and highly reliable milling device which effectively removes either pith or epidermis without disrupting or damaging the rind fiber structure. The relatively small character of the milling roll, coupled with the radial configuration of the milling ridges, contributes to ease of and economy in fabrication of the milling rolls. The operating life of such rolls is quite long so as to produce unusually sustained periods of separator operations.

The toothed gripping roll which cooperates with the milling rolls to limit the velocity of stalk material being milled is also significant.

In positively controlling stalk material velocity without significantly damaging the rind fibers, the toothed gripping mills provide effective feed control of the stalk material as it is being milled. This velocity control and overall stabilizing of the stalk material provides for positive control throughout the milling operation with minimum structure. Obviously, this arrangement, through its simplicity and reliability, contributes to the ability to effect high-speed milling of stalk material.

The combined effect of the milling and gripping rolls of producing rind flattening and either pith or epidermis removal is significant. It completely avoids recourse to separate, stalk flattening equipment.

The shuttle mounting of separator units enables a separation operation to be continuous, by moving alternate separators into operating position while a primary separator is being serviced.

The modular stacking of separator units between rind conveyors provides a space-conserving arrangement for extending plant capacity as desired. The "wrap-around," rind-shaking and screening conveyors, in addition to conserving on space, provide a highly effective arrangement for removing residual pith and collecting this pith at the same area where pith is collected from the primary or milling operation.

The radical, symmetric, nature of the ridges of the milling rolls enables them to be reversed as desired, so that each side of the milling ridges may function as radial planing edges, depending upon the direction of rotation of the milling rolls. Similarly, the symmetric "butterfly" shape of the shrouds enables them to be reversed.

In describing the invention, reference has been made to a preferred embodiment. However, those skilled in the sugarcane handling and processing art and familiar with this disclosure may well recognize additions, deletions, substitutions or other modifications which would fall within the purview of the invention as defined in the appended claims.

I claim:

1. A method for separating pith and rind components of sugarcane stalk, said method comprising:

feeding sugarcane stalk material while maintaining said stalk material generally aligned with the feed direction;

opening-up said sugarcane stalk longitudinally while said stalk is being fed;

separating the portions of said stalk material formed by said opening-up;

completely flattening each stalk material portion to a planar configuration such that the rind component of each portion is confined, while passing through a zone, to a substantially completely flattened configuration;

while said stalk material portion is passing through said zone, milling away pith from one side of said stalk material portion, and while said stalk material portion is being milled to remove pith therefrom, gripping said stalk material portion to maintain the velocity of said portion, independent of forces imposed on said portion by said milling, said gripping being effected by engaging the side of said portion opposite to said one side and partially penetrating the rind of said portion;

in said zone and with ridge periphery means, engaging the one side of said stalk material portion along a direction extending transversely of the feed direction of said stalk material portion means to cause said complete flattening of said stalk material portion; and effecting said milling and said engaging of said one side of said stalk material portion to cause the flattening thereof with rotating milling roll means, with said milling roll means including a plurality of ridge means circumferentially spaced about the axis of rotation of said milling roll means, each said ridge means providing a said ridge periphery means and a pith milling side operable to remove pith from said one side of said stalk material portion;

said engaging of said one side of said stalk material portion cooperating with said partial penetrating of said rind of said stalk material portion to effect said complete flattening of said stalk material portion concurrent with said maintaining of the velocity of said stalk material portion independent of forces imposed on said stalk material portion by said milling.

2. A method for separating pith and rind components of sugarcane stalk, said method comprising:

feeding sugarcane stalk material while maintaining said stalk material generally aligned with the feed direction;

opening up said sugarcane stalk longitudinally while said stalk is being fed;

separating the portions of said stalk material formed by said opening-up;

completely flattening each stalk material portion to a planar configuration such that the rind component of each portion is confined, while passing through a zone, to a substantially completely flattened configuration;

while said stalk material portion is passing through said zone, milling away from one side of said stalk material portion, and while said stalk material portion is being milled to remove pith therefrom, gripping said stalk material portion to maintain the velocity of said portion, independent of forces imposed on said portion by said milling, said gripping being effected by engaging the side of said portion opposite to said one side and partially penetrating the rind of said portion;

in said zone and with ridge periphery means, engaging the one side of said stalk material portion along a direction extending transversely of the feed direction of said stalk material portions to cause said complete flattening of said stalk material portion; and milling epidermis material away from the side of said stalk material portion opposite to said one side and concurrently maintaining said stalk material portion in a flattened condition.

3. A method for separating pith and rind components of sugarcane stalk, said method comprising:

feeding sugarcane stalk material while maintaining said stalk material generally aligned with the feed direction;

opening-up said sugarcane stalk longitudinally while said stalk is being fed;

separating the portions of said stalk material formed by said opening-up;

flattening each stalk material portion such that the rind component of each portion is confined, while passing through a zone, to a substantially flattened configuration;

while said stalk material portion is passing through said zone, milling away pith from one side of said stalk material portion; and while said stalk material portion is being milled to remove pith therefrom, gripping said stalk material portion to maintain the velocity of said portion, independent of forces imposed on said portion by said milling, said gripping being effected by engaging the side of said portion opposite to said one side, with holding surface means which partially penetrate the rind of said portion and extend transversely of the feed direction of said portion;

milling epidermis material away from the side of said stalk material opposite to said one side and concurrently maintaining said stalk material in a flattened condition;

conveying rind components of stalk material from which pith material and epidermis material have been milled away;

shaking said rind components to separate residual pith therefrom; and separating said separated pith from said rind components by screening.

4. Apparatus for separating pith and rind components of sugarcane stalk, said apparatus comprising:

means for feeding sugarcane stalk material while maintaining said stalk material generally aligned with the feed direction;

means for opening up said sugarcane stalk longitudinally while said stalk is being fed;

means for separating the portions of said stalk material formed by said opening-up;

means for completely flattening a stalk material portion to a planar configuration such that the rind component of said stalk material portion is confined, while passing through a zone, to a substantially completely flattened configuration;

means for milling away pith from one side of said stalk material portion while said stalk material portion is passing through said zone; and means for gripping said stalk material portion while said portion is being milled to remove pith therefrom to maintain the velocity of said portion, independent of forces imposed on said portion by said milling, said gripping means including penetrating means operable to partially penetrate the rind of said portion; and said means for completely flattening said stalk material portion in said zone including a plurality of ridge periphery means operable to engage said one side of said stalk material portion along a direction extending transversely of the feed direction of said stalk material portion; and rotary milling roll means including a plurality of ridge means spaced circumferentially about the axis of rotation of said milling roll means, with each said ridge means having a said ridge periphery means and a pith milling side, and with said pith milling side being included in said means for milling away pith and being operable to remove pith from said one side of said stalk material portion;

said ridge periphery means cooperating with said gripping means to effect said complete flattening of said stalk material portion concurrent with said maintaining of the velocity of said stalk material portion independent of forces imposed on said stalk material portion by said milling.

5. An apparatus as described in claim 4 wherein:

each ridge of said milling roll means projects radially of the axis of rotation of said roll and has a planar milling side parallel to a radial plane of said milling roll means; and each said ridge means further has a rind-contacting ridge periphery means curved in an arc having a radius extending to the outer radial periphery of said roll and intersecting a pith milling side.

6. An apparatus as described in claim 4 wherein said means for gripping said stalk material portion comprises a rind-gripping roll including a plurality of axially spaced rows of gripping teeth comprising said penetrating means, with the teeth of each row being circumferentially spaced and inclined rearwardly of the peripheral feed direction of said rind-gripping roll.

7. An apparatus as described in claim 4 including:

base means supporting said means for opening up said stalk and one of said means for milling away pith and means for gripping said stalk material portion, and wing means pivotally mounted on said base means and supporting the other of said means for milling away pith and means for gripping said stalk material portion.

8. An apparatus as described in claim 7 wherein said means for opening up sugarcane stalk includes:

blade means, a pair of stalk material feeding rolls operable to engage and feed stalk material longitudinally of said means and into splitting engagement therewith; and resilient, peripheral portions encircling each of said feeding rolls and spaced so as to be flattened by stalk material passing therebetween, with said flattened resilient peripheral portions yieldably maintaining stalk material in longitudinal alignment with said splitting edge; and wherein said apparatus further includes rind-handling means for conveying rind components of stalk material portions from which a stalk component has been removed by said milling means, said rind-handling means comprising vibrating means for shaking said handling means to separate residual pith from said rind components; and screen means through which said separated residual pith gravitates, with said screen means being operable to retain said rind components.

9. An apparatus as described in claim 8 wherein said apparatus further includes means for milling epidermis material away from the side of said stalk material portion opposite to said one side and concurrently maintaining said stalk material portion in a flattened condition;

wherein said apparatus further includes fluid conveying means for conveying away the epidermis material milled from the stalk material portion;

wherein said means for milling epidermis material away from said stalk material portion comprises epidermis milling roll means including a plurality of ridge means, each ridge means of each said epidermis milling roll means projecting radially of the axis of rotation of the epidermis milling roll means and having a planar milling side parallel to a radial plane of the epidermis milling roll means, and each said ridge means of said epidermis milling roll means further having a rind-gripping periphery curved in an arc having a radius extending to the outer radial periphery of said roll and intersecting a said milling side of said ridge means of said epidermis milling roll means;

wherein said means for gripping said stalk material portion comprises a rind-gripping roll including a plurality of axially spaced rows of gripping teeth, with the teeth of each row being circumferentially spaced and inclined rearwardly of the peripheral feed direction of said rind-gripping roll.

10. Apparatus for separating pith and rind components of sugarcane stalk, said apparatus comprising:

means for feeding sugarcane stalk material while maintaining said stalk material generally aligned with the feed direction;

means for opening-up said sugarcane stalk longitudinally while said stalk is being fed;

means for separating the portions of said stalk material formed by said opening-up;

means for completely flattening a stalk material portion to a planar configuration such that the rind component of said stalk material portion is confined, while passing through a zone, to a substantially completely flattened configuration;

means for milling away pith from one side of said stalk material portion while said stalk material portion is passing through said zone; and means for gripping said stalk material portion while said portion is being milled to remove pith therefrom to maintain the velocity of said portion, independent of forces imposed on said portion by said milling, said gripping means including penetrating means operable to partially penetrate the rind of said portion; and said means for completely flattening said stalk material portion in said zone including ridge periphery means operable to engage said one side of said stalk material portion along a direction extending transversely of the feed direction of said stalk material portion; and means for milling away pith from one side of said stalk said stalk material portion opposite to said one side and concurrently maintaining said stalk material portion in a flattened condition.

11. An apparatus as described in claim 10:

wherein said apparatus includes a pith milling roll including a plurality of milling ridges;

each ridge of said pith milling roll projecting radially of the axis of rotation of said roll and having a planar milling side parallel to a radial plane of said pith milling roll, with said milling sides of said milling ridges comprising said means for milling away pith from said one side of said stalk material portion;

each said ridge of said pith milling roll further having a rind-contacting periphery curved in an arc having a radius extending to the outer radial periphery of said pith milling roll and intersecting a ridge milling side, with said rind contacting peripheries comprising said ridge periphery means;

said apparatus further including an epidermis material milling roll including a plurality of epidermis milling ridges;

said epidermis milling ridges having milling sides operable to mill away epidermis material from said side of said stalk material portion opposite to said one side; and said epidermis milling ridges having rind-contacting peripheries operable to effect said maintaining of said stalk material portions in a flattened condition concurrently with said milling of epidermis material;

said milling sides and said rind-contacting peripheries of said epidermis milling ridges comprising said means for milling epidermis material from the side of said stalk material portion opposite to said one side and concurrently maintaining said stalk material portion in a flattened condition.

12. An apparatus as described in claim 11:

wherein said means for gripping said stalk portion comprises a first rind-gripping roll including a plurality of axially spaced rows of gripping teeth, with the teeth of each row being circumferentially spaced and inclined rearwardly of the peripheral feed direction of said first rind-gripping roll; and wherein said apparatus includes a second rind-gripping roll having a plurality of axially spaced rows of gripping teeth, with the teeth of each row being circumferentially spaced and inclined rearwardly of the peripheral feed direction of the second, rind-gripping roll, and with said second rind-gripping roll cooperating with said epidermis material milling roll to effect said milling of epidermis material and maintaining of said stalk material portion in a flattened condition.

13. An apparatus as described in claim 12 including mounting means for simultaneously separating said pith milling roll and first rind-gripping roll and separating said epidermis material milling roll and said second rind-gripping roll; said mounting means comprising relatively fixed base means supporting said means for opening up said stalk, said pith milling roll and said second rind-gripping roll; said mounting means further including wing means pivotally mounted on said base means and supporting said first rind-gripping roll and said epidermis material milling roll.

14. Apparatus for processing sugarcane stalk to separate said stalk into its components, said apparatus comprising:

a first sugarcane rind conveyor;

a second sugarcane rind conveyor spaced from said first sugarcane rind conveyor;

sugarcane pith receiving means having a pith receiving zone; and at least one separator unit mounted to discharge pith into said pith receiving zone, said separator unit including sugarcane stalk opening means operable to open-up sugarcane stalk material portions longitudinally, first pith separating means disposed between said sugarcane opening means and said first sugarcane rind conveyor and operable to separate pith from the rind of one portion of said opened-up sugarcane stalk material, first pith passage means for conveying pith separated from said one portion of opened-up sugarcane stalk material to said pith receiving zone, second pith separating means independent of and spaced from said first pith separating means and disposed between said opening means and said second rind conveyor and operable to separate pith from the rind of another portion of opened-up sugarcane stalk material, and second pith passage means for conveying pith separated from said other portion of opened-up sugarcane stalk material to said pith receiving zone;

first rind handling means for conveying rind separated from said one portion of opened-up sugarcane stalk material over said pith receiving zone and generally toward said second rind conveyor;

first means for removing pith from rind on said first rind handling means and causing said pith to enter said pith receiving zone;

second rind handling means for conveying the rind separated from said other portion of opened-up sugarcane stalk material over said pith receiving zone and generally toward said first rind conveyor;

second means for removing pith from rind on said second rind handling means and causing said pith to enter said pith receiving zone;

said first and second rind-handling means, in combination, generally encircling said pith receiving zone.

15. Apparatus for processing sugarcane stalk to separate said stalk into its components, said apparatus comprising:

a first sugarcane rind conveyor;

a second sugarcane rind conveyor spaced from, but extending parallel with, said first sugarcane rind conveyor;

sugarcane pith receiving means having a pith receiving zone between said first and second rind conveyors; and at least one separator unit mounted above said pith receiving zone, said separator unit including sugarcane stalk splitting means operable to split stalk material portions longitudinally, first pith separating means disposed between said splitting means and said first rind conveyor and operable to separate pith from the rind of one half of split sugarcane stalk material, first pith passage means for conveying pith separated from said stalk material half to said pith receiving zone, second pith separating means disposed between said splitting means and said second rind conveyor and operable to separate pith from the rind of another half of split sugarcane stalk material, and second pith passage means for conveying pith separated from said other stalk material half to said pith receiving zone;

first rind handling means for conveying rind separated from said stalk material half over said pith receiving zone and generally toward said second rind conveyor while concurrently shaking said rind to remove residual pith therefrom, said first rind handling means including means for screening removed residual pith from rind above said pith receiving zone and allowing said screened, residual pith to fall into said pith receiving zone, second rind handling means for conveying the rind separated from said other stalk material half over said pith receiving zone and generally toward said first rind conveyor, while concurrently shaking said rind to remove residual pith therefrom, said second rind handling means including means for screening removed residual pith from rind above said pith receiving zone and allowing said screened residual pith to fall into said pith receiving zone.

16. An apparatus as described in claim 15 wherein said stalk-splitting means includes a splitting blade having an edge operable to engage ends of stalk material and split said stalk material longitudinally, and a pair of peripherally resilient feed rolls operable to engage opposite sides of stalk material and grip and feed said stalk material into splitting cooperation with said blade edge;

wherein each of said first and second pith separating means includes a milling roll operable to flatten stalk material and mill away pith from one side thereof, and a gripping roll operable to partially penetrate the opposite side of said rind material and limit the velocity of said rind material to the peripheral velocity of said gripping roll.

17. An apparatus for separating the components of sugarcane stalk, said apparatus comprising:

base means including opening means operable to longitudinally open up stalk material, a plurality of stalk material grinding surfaces extending away from said opening means, pith removing means;

first gripping means operable to engage and limit the travel speed of rind;

feed means operable to grip said stalk material and feed said stalk material into engagement with said opening means;

second gripping means operable to engage and limit the travel speed of rind;

epidermis removing means;

said pith removing means and said second gripping means cooperating to remove pith from one side of opened up stalk material, said epidermis removing means and said first gripping means cooperating to remove epidermis material from another side of said opened up stalk material; and wing means pivotally mounted on said base means and supporting one of said gripping means and one of said pith removing means and epidermis removing means with the other of said gripping means and the other of said pith removing means and epidermis removing means being carried by said base means;

said wing means being operable to be pivoted to cause separation of said one of said gripping means and said pith removing means and concurrent separation of the other of said gripping means and said epidermis removing means.

18. An apparatus for separating the components of sugarcane stalk, said apparatus comprising:

a stalk material splitting base, said base including, blade means, operable to longitudinally split stalk material and having an upwardly facing splitting edge, a pair of split stalk material deflecting surfaces diverging downwardly away from said splitting edge, a first, pith removing, milling roll mounted adjacent the terminus of one of said deflecting surfaces for rotation about an axis generally parallel to but disposed beneath the plane of said one deflecting surface, said first milling roll including generally radially extending, pith milling ridges operable to generally tangentially engage the interface between rind and pith components of stalk material supported by the terminus of said deflecting surface, first blade means operable to cause rind and pith separated by said first milling roll to diverge, in moving away from said first milling roll, while providing a planar support for said rind, and a first gripping roll mounted for rotation about an axis disposed beneath the plane of said rind supporting surface but parallel thereto, with said gripping roll being generally tangentially aligned with said rind supporting surface;

a movable wing mounted on one end of said base and including, resilient feed roll means mounted for rotation about an axis generally parallel to said cutting edge and operable to resiliently grip said stalk material and feed said stalk material into splitting engagement with said splitting edge, at least one guide roll mounted for rotation about an axis parallel to said one deflecting surface and spaced therefrom, said guide roll being operable to maintain split stalk material in engagement with said deflecting surface, a second gripping roll mounted for rotation about an axis parallel to the axis of said first milling roll and spaced above the plane of said deflecting surface, a second milling roll having an axis of rotation parallel to the axis of rotation of said first gripping roll and positioned about the plane of said rind supporting surface;

said first milling roll and second gripping roll cooperating to remove pith from one side of split stalk material;

said second milling roll and said first gripping roll cooperating to remove epidermis material from another side of said split stalk material; and pivot means supporting said wing for pivotable movement about a horizontal axis whereby said second milling roll and second gripping roll may be simultaneously separated from said first milling roll and said first gripping roll through upward movement of said wing.

19. An apparatus for separating material from one side of the rind of sugarcane stalk, said apparatus comprising:

a milling roll including a plurality of milling ridges;

each ridge projecting radially of the axis of rotation of said roll and having a planar milling side parallel to a radial plane of said roll;

each said ridge further having a rind-contacting periphery, curved in an arc having a radius extending to the outer radial periphery of said roll, and intersecting said milling side;

a rind gripping roll mounted for rotation about an axis parallel to but spaced from the axis of rotation of said milling roll;

means for feeding sugarcane stalk material between said milling and rind gripping rolls;

means for rotating said milling roll so that the periphery thereof travels at a substantially greater speed than the peripheral speed of said gripping roll, said gripping roll being operable to restrain said material moving between said milling and gripping rolls to the peripheral speed of said gripping roll;

said rind gripping roll including a plurality of axially spaced rows of gripping teeth, with the teeth of each row being circumferentially spaced and inclined rearwardly of the peripheral feed direction of said rind gripping roll;

generally planar support means operable to support rind moving away from said milling and gripping rolls;

deflecting surface means operable to deflect pith, milled from said rind by said milling roll, away from said planar support means;

selectively adjustable mounting means supporting said planar support means and said deflector surface means for movement of said planar support means and said deflector surface means toward and away from said milling roll; and an arcuate guide surface, interposed between said planar support means and said milling roll, and having a radius of curvature at least equal to the radius extending to the outer radial periphery of said milling roll and arranged, relative to said planar support means and said deflector surface means, so as to conformingly engage the outer periphery of said milling roll prior to engagement of said milling roll with said planar support means; and blade means including a plurality of detritus removing fingers, each finger projecting into an annular space between adjacent rows of gripping teeth of said rind gripping roll.

References Cited

UNITED STATES PATENTS

| 623,753 | 4/1899 | Winchell | 130—31 |
|---------|--------|----------|--------|
| 623,754 | 4/1899 | Winchell | 130—31 |
| 627,882 | 6/1899 | Sherwood | 130—31 |
| 631,186 | 8/1899 | Sherwood | 130—31 |
| 632,789 | 9/1899 | Remy | 130—31 |
| 926,599 | 6/1909 | Peters | 130—31X |
| 1,689,387 | 10/1928 | Heimlich | 130—31 |
| 3,424,611 | 1/1969 | Miller | 127—2 |
| 3,424,612 | 1/1969 | Miller | 127—2 |

JOSEPH SCOVRONEK, Primary Examiner

D. G. CONLIN, Assistant Examiner

U.S. Cl. X.R.

127—42, 43, 53; 130—31; 146—236

UNITED STATES PATENT OFFICE
CERTIFICATE OF CORRECTION

Patent No. 3,567,510            Dated March 2, 1971

Inventor(s) Sydney E. Tilby

It is certified that error appears in the above-identified patent and that said Letters Patent are hereby corrected as shown below:

IN THE SPECIFICATION

Column 1, line 32, change "modulator" to -- modular -- .
Column 1, line 63, change "it" to -- is -- .
Column 2, line 1, change "miller" to -- Miller -- .
Column 2, line 18, change "miling" to -- milling -- .
Column 2, line 60, insert -- from -- before "op-".
Column 2, line 62, change "material" to -- materials -- .
Column 2, line 63, delete "is".
Column 9, line 61, change "way" to -- away -- .

Column 13, line 65, change "pitch" to -- pith -- .
Column 16, line 3, change "radical" to -- radial -- .

IN THE CLAIMS

Claim 8, line 5, after "said" and before "means" insert -- blade -- .
Claim 10, line 30, after "milling" delete "away pith" and insert -- epi mis material --; delete "one" and insert -- the -- ; delete "said stalk".
Claim 17, line 19, insert a hyphen (-) between "opened" and "up".

Signed and sealed this 10th day of August 1971.

(SEAL)
Attest:

EDWARD M.FLETCHER,JR.          WILLIAM E. SCHUYLER, J.
Attesting Officer                  Commissioner of Patent